(12) United States Patent
Seo et al.

(10) Patent No.: US 7,212,330 B2
(45) Date of Patent: May 1, 2007

(54) THREE-DIMENSIONAL IMAGING SYSTEM FOR PATTERN RECOGNITION

(75) Inventors: Cheong Soo Seo, Seongnam (KR); Gyoung Il Cho, Seoul (KR)

(73) Assignees: Angstrom, Inc., Suwon (KR); Stereo Display, Inc., Anaheim, CA (US)

( * ) Notice: Subject to any disclaimer, the term of this patent is extended or adjusted under 35 U.S.C. 154(b) by 0 days.

(21) Appl. No.: 11/294,944

(22) Filed: Dec. 6, 2005

(65) Prior Publication Data

US 2006/0098872 A1 May 11, 2006

Related U.S. Application Data

(63) Continuation-in-part of application No. 10/983,353, filed on Nov. 8, 2004, and a continuation-in-part of application No. 10/893,039, filed on Jul. 16, 2004, and a continuation-in-part of application No. 10/872, 241, filed on Jun. 18, 2004, and a continuation-in-part of application No. 10/806,299, filed on Mar. 22, 2004, now Pat. No. 7,057,826.

(51) Int. Cl.
| | |
|---|---|
| G02B 26/08 | (2006.01) |
| G02B 26/00 | (2006.01) |
| G06K 9/00 | (2006.01) |
| G06K 9/48 | (2006.01) |
| G06K 9/46 | (2006.01) |
| G06K 9/52 | (2006.01) |
| G01B 11/24 | (2006.01) |

(52) U.S. Cl. ............... 359/298; 359/291; 382/181; 382/199; 382/203; 382/206; 356/601

(58) Field of Classification Search ............... 359/290, 359/291, 295, 298, 225, 226, 625, 626, 846, 359/721, 627; 345/6; 382/181, 199, 203, 382/206; 356/601

See application file for complete search history.

(56) References Cited

U.S. PATENT DOCUMENTS

| | | | |
|---|---|---|---|
| 4,584,704 A | 4/1986 | Ferren | |
| 6,438,272 B1 * | 8/2002 | Huang et al. | ............... 382/286 |
| 6,611,343 B1 * | 8/2003 | Frankowski | ............... 356/601 |
| 6,866,200 B2 | 3/2005 | Marx et al. | |
| 6,919,803 B2 | 7/2005 | Breed | |
| 6,947,579 B2 | 9/2005 | Bronstein et al. | |

OTHER PUBLICATIONS

C. Hesher, A. Srivastava, and G. Erlebacher, "A Novel Technique for Face Recognition using Range Images," the 7th International Symposium on Signal Processing and its Application, 2003.

(Continued)

*Primary Examiner*—Ricky Mack
*Assistant Examiner*—Jack Dinh

(57) ABSTRACT

The present invention provides a real-time three-dimensional pattern recognition imaging system having a variable focal length, a wide depth of field, a high depth resolution, a fast acquisition time, a variable magnification, a variable optical axis for tracking, and capability of compensating various optical distortions and aberrations, which enables pattern recognition systems to be more accurate as well as more robust to environmental variation. The imaging system for pattern recognition comprises one or more camera system, each of which has at least one micromirror array lens(MMAL), a two-dimensional image senor, and an image processing unit. A MMAL has unique features including a variable focal length, a variable optical axis, and a variable magnification.

17 Claims, 5 Drawing Sheets

OTHER PUBLICATIONS

G. Medioni and R. Waupotitsch, "Face Modeling and Recognition in 3-D," Proceedings of the IEEE International Workshop on Analysis and Modeling of Faces and Gestures, pp. 232-233, Oct. 2003.

Kevin W. Bowyer, Kyong Chang, and Patrick Flynn, "A Survey Of 3D and Multi-Modal 3D+2D Face Recognition," Notre Dame Department of Computer Science and Engineering Technical Report, TR-2004-22-9, 2004.

K. Chang, K. Bowyer, P. Flynn, and X. Chen, "Multimodal Biometrics Using Appearance, Shape and Temperature," The 6th IEEE International Conference on Automatic Face and Gesture Recognition, May 2004.

* cited by examiner

THREE-DIMENSIONAL IMAGING SYSTEM FOR PATTERN RECOGNITION

REFERENCE TO RELATED APPLICATIONS

This application is a continuation-in-part of, and claims priority to U.S. patent application Ser. No. 10/806,299 filed Mar. 22, 2004 now U.S. Pat. No. 7,057,826, U.S. patent application Ser. No. 10/983,353 filed Nov. 8, 2004, U.S. patent application Ser. No. 10/872,241 filed Jun. 18, 2004, U.S. patent application Ser. No. 10/893,039 filed Jul. 16, 2004, all of which are hereby incorporated by reference.

FIELD OF INVENTION

The present invention relates to imaging systems, and in particular, a three-dimensional imaging system for pattern recognition.

BACKGROUND OF INVENTION

Pattern recognition classifies observed or measured data into certain categories using statistical or syntactic (neural network) approaches. Applications include industrial inspection, biometrics such as fingerprint, iris, and face recognition, weather map analysis for forecasting, character recognition, speech recognition, and bar code recognition. Many of these use the spatial form of data such as pictures or video images.

Fingerprint recognition is widely used for personal identification or forensic investigation. Fingerprint is scanned by optical, silicon, or ultrasound technologies. The optical method uses the CCD (Charge Coupled Device) to convert a fingerprint image into digital form. The accuracy of optical scanning can be degraded by latent images left from previous users and wear of coating and CCD. The silicon technology provides a high resolution image using the DC capacitance between a silicon sensor and the finger, but careful scanning process and verification is required due to its inherent small sensor size, which makes capturing the center of a finger difficult. The ultrasound technology is not widely used yet but considered as a most accurate and robust fingerprint scanning method by providing a large platen size and penetrating the dirt and residue on the platen and the finger.

An iris scan is known as a most accurate biometric authentication method. The iris is the visible colored area surrounding pupil, which controls the amount of the light entering the eye. Each individual iris has hundreds of comparison features and very stable over time. The iris is scanned by a camera system with an eye safe illumination device from several inches to several feet away.

While these biometric applications provide great accuracy, these systems require user's cooperation because the finger or the iris need to be carefully positioned relative to the sensor, which can cause problems in a high-throughput application or surveillance system.

Face recognition for personal authentication or surveillance is less intrusive; in other words, need less or no subject's cooperation. A face recognition system extracts a face image from a surveillance video system, and aligns and normalizes the face image to compare with images in the facial database. There exists a plurality of fiducial points in the human face which can be used in face recognition including distance between eyes, width of nose, depth of eye sockets, jaw line, and the like. Popular face recognition algorithms include eigenface method, hidden Markov model approach, and dynamic link matching method. Majority of face recognition algorithms uses two-dimensional images and their accuracy is greatly subject to environmental factors including face pose, illumination, cosmetics, and face expression.

Many literatures including C. Hesher, A. Srivastava, and G. Erlebacher, "A Novel Technique for Face Recognition using Range Images," *the Seventh International Symposium on Signal Processing and its Applications,* 2003, and G. Medioni and R. Waupotitsch, "Face Modeling and Recognition in 3-D," *Proceedings of the IEEE International Workshop on Analysis and Modeling of Faces and Gestures,* pages 232–233, October 2003, claim that face recognition accuracy and reliability can be remarkably increased by employing three-dimensional facial geometries because three-dimensional images represent the internal anatomical structure which is less varied by environmental factors than the external appearance.

The recent survey of three-dimensional face recognition algorithms is given by Kevin W. Bowyer, Kyong Chang, and Patrick Flynn, "A Survey Of 3D and Multi-Modal 3D+2D Face Recognition," *Notre Dame Department of Computer Science and Engineering Technical Report,* TR-2004-22-9, 2004.

While three-dimensional face recognition approaches promise to resolve their two-dimensional counterpart problems, a major challenge on three-dimensional face recognition systems is the acquisition of three-dimensional images for both facial database and surveillance. Conventionally, three-dimensional images can be obtained from a stereoscopic imaging system or a structured-light system. Bowyer et al. described the problems related to these conventional sensors, which include a narrow depth of field, lower depth resolution, and longer acquisition time.

The aforementioned problems can be more critical to the non-intrusive approach, where a subject is unaware of surveillance or moving. In this case, the subject can not be positioned at the optimal working range of an imaging system, while most three-dimensional imaging systems have a limited range of depth of field. Further, the research suggested that effective depth resolution for successful three-dimensional face recognition is less than 1 mm (K. Chang, K. Bowyer, P. Flynn, and X. Chen, "Multimodal Biometrics Using Appearance, Shape and Temperature," *The 6th IEEE International Conference on Automatic Face and Gesture Recognition,* May 2004), which requires 200 or more pixels in the depthwise direction of a three-dimensional image considering the size of the human head. Conventional three-dimensional imaging systems require a half to ten seconds to obtain this resolution image. In this speed, it is almost impossible to obtain usable images of the subject who is moving.

Beside face recognition, many other pattern recognition problems such as industrial inspection and medical image registration also can have benefits from the three-dimensional approach. However, three-dimensional imaging systems need to be improved to satisfy current demands for three-dimensional pattern recognition.

SUMMARY OF INVENTION

The present invention provides a real-time three-dimensional imaging system for pattern recognition having a wide depth of field, a high depth resolution, a fast acquisition time, a variable field of view for magnification, a variable optical axis for tracking, and capability of compensating various optical distortions and aberrations, which enables pattern recognition system to be more accurate as well as more robust to environmental variation.

The imaging system for pattern recognition comprises one or more camera system, each of which has at least one variable focal length lens, a two-dimensional image senor, and an image processing unit. The variable focal length lens comprises a micromirror array lens (MMAL), which has unique features including a variable focal length, a variable optical axis, and a variable field of view.

One aspect of the invention is to provide a three-dimensional imaging system which generates an all-in-focus image and depth information of a captured scene or an object. The image sensor takes two-dimensional images with different focal planes that are shifted by changing the focal length of the variable focal length lens. The image processing unit extracts in-focus pixels or areas from original two-dimensional images at different focal planes to generate an all-in-focus image. Based on the known focal length, full three-dimensional position data of a scene or an object can be reconstructed. All the processes are achieved in real-time. The all-in-focus image with the depth information enables the pattern recognition to be more accurate and robust since three-dimensional pattern recognition is less subject to the object orientation, illumination, and other environmental factors. Unlike conventional stereo imaging system that requires at least two cameras or structured light system and a projector to project a known geometric pattern onto an object, the current invention can determine the three-dimensional information using only a single camera, and this renders a simpler camera calibration and a more compact system.

The next aspect of the invention is to provide a three-dimensional imaging system with a wide depth of field. The current invention has very wide effective range of the depth of field in that it is capable of acquiring an all-in-focus image. It is possible to have a wide effective range of the depth of field because the variable focal length lens has a large range of focal length variation.

Another aspect of the invention is to provide a three-dimensional imaging system with a high depth resolution with a fast acquisition time. The variable focal length lens of this invention can change its focal length very fast, which allows producing an all-in-focus three-dimensional image with a high depth resolution at the standard television or movie frame rate or faster. The fast acquisition time makes the motion of the object ignorable.

Another aspect of the invention is to provide a three-dimensional imaging system with an efficient object search and tracking function. It is desirable that an object of interest such as human face and manufactured part is searched in a wide field of view with a relatively low resolution image while being tracked in a narrow field of view with a higher resolution image for pattern recognition. The MMAL of the current invention has a large range of focal length variation, which can offer a variable field of view.

Tracking system usually requires that the object be in the center of the image sensor. However, this usually entails a camera attitude control with a macroscopic servo mechanism, which is slow and expensive to operate. In the current invention, it is possible to adjust the optical axis of the MMAL to make the object image in the center of the image sensor for a limited range without using a macroscopic servo mechanism. Therefore, when the MMAL is employed in the tracking scheme, the imaging system can be simplified and lightly weighted.

Another aspect of the invention is to provide a three-dimensional imaging system that can compensate for various optical distortions or aberrations by translation and/or rotation of individual micromirrors.

The MMAL includes a plurality of micromirrors. Translation and rotation of each micromirror in the MMAL are controlled in order to vary the focal length of the variable focal length lens.

The MMAL is an adaptive optical component. The MMAL compensates for phase errors of light introduced by the medium between an object and its image, and corrects the defects of the three-dimensional imaging system that may cause the image to deviate from the rules of paraxial imagery.

The MMAL can change its optical axis by changing the curvature of the mirror array. An object that does not lie on the optical axis can be imaged by the MMAL without any macroscopic mechanical movement of the three-dimensional imaging system.

The imaging system for a three-dimensional pattern recognition system includes a reflecting MMAL and an image sensor to perform three-dimensional imaging. The MMAL focuses the image onto the image sensor.

Different focusing geometry is possible for imaging the object onto the image sensor. The MMAL makes an image by directly reflecting light from the image onto the image sensor. A beam splitter in a beam path can be used for forming a different geometry. Alternatively, the MMAL is positioned so that the path of the light reflected by the MMAL is not blocked without using a beam splitter.

Since the micromirror has a tiny mass, the lens comprising the micromirrors has a very fast response time down to hundreds of microseconds. The lens has a large focal length variation with a fine resolution and a high optical focusing efficiency. In addition, the lens design allows a large-sized lens, makes the focusing system very simple, and demands low power consumption. The lens has low production costs because of the advantage of mass productivity. Electric circuits to operate the micromirrors can be replaced with known semiconductor technologies such as MOS and CMOS. The lens can also compensate for aberration. The lens can compensate for optical errors caused by the medium between the object and its image, and/or corrects the defects of the lens system.

The MMAL used in the present invention has the following advantages: (1) the MMAL has a very fast response time due to the tiny mass of the micromirror; (2) the lens has a compact size that is suitable for both a small and large missile systems; (3) the lens has a large focal length variation because large numerical aperture variations can be achieved by increasing the maximum rotational angle of the micromirror; (4) the lens has a high optical efficiency; (5) the lens can have a large-sized aperture without losing optical performance since the MMAL includes discrete micromirrors, the increase of the lens size does not enlarge the aberration caused by the shape error of a lens; (6) the production cost is inexpensive due to the advantage of mass productivity of the microelectronics manufacturing system; (7) the lens compensates for aberration of imaging system; (8) the lens makes the focusing system much simpler; (9) the lens requires small power consumption when electrostatic actuation is used to control it.

The invention of the three-dimensional imaging system for pattern recognition using the MMAL has the following advantages: (1) the system detects a real-time three-dimensional motions; (2) the system needs only a single imaging sensor with no extra sensors nor extra imaging device; (3)

the system provides all-in-focus images which enables high precision pattern recognition; (4) the system has a wide effective depth field since the system has a large range of focal depth; (5) the system has a large variation of field of view since the system has a large range of focal depth; (6) the system uses a large field of view for the search mode and a small field of view for the identification or tracking mode using a time-sharing technique; (7) the system has a high depth resolution; (8) the production cost is inexpensive because the MMAL is inexpensive; (9) the system is very simple and compact because there is no macroscopic mechanical displacement or deformation of the lens; (10) the system demands low power consumption when the MMAL is actuated by electrostatic force.

Although the present invention is briefly summarized herein, the full understanding of the invention can be obtained by the following drawings, detailed description, and appended claims.

DISCRIPTION OF FIGURES

DETAILED DESCRIPTION OF THE ILLUSTRATED EMBODIMENTS

Figure 1:
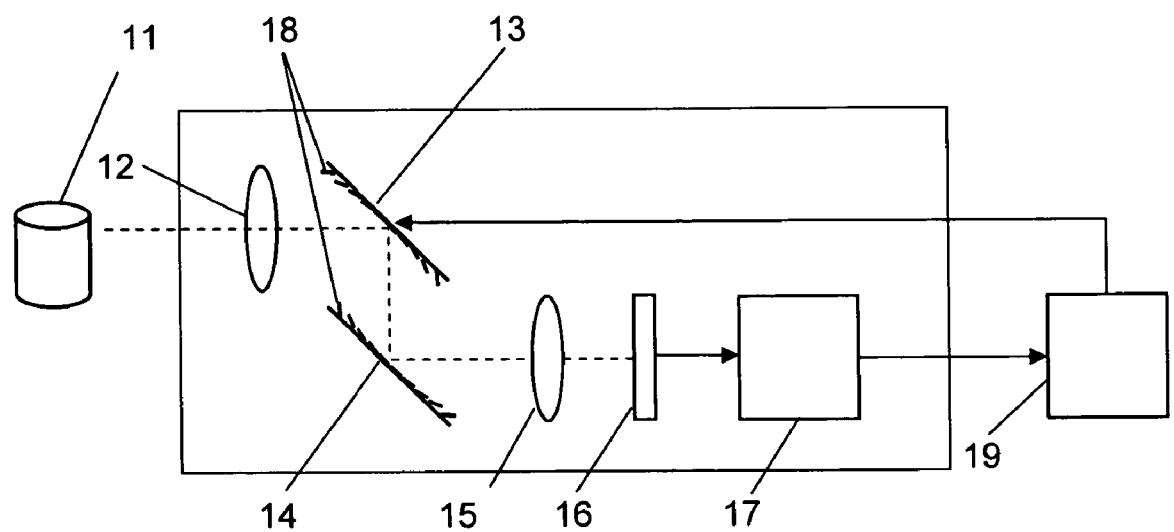
FIG. 1 illustrates a real-time three-dimensional imaging system for pattern recognition according to the preferred embodiment of the present invention.

FIG. 1 illustrates a real-time three-dimensional imaging system for pattern recognition according to the preferred embodiment of the present invention. The imaging system takes an image from the object 11 by using an objective lens 12, the first variable focal length lens 13, the second variable focal length lens 14, and an auxiliary lens 15. The imaged pattern in an image sensor 16 is processed by an image processing unit 17. The image sensor 16 receives two-dimensional images with different focal planes that are shifted by changing the focal length of the variable focal length lens 14. The image processing unit 17 extracts in-focus pixels or areas from original pictures with different focal planes to generate an all-in-focus image with depth information. The focal length of the variable focal length lens 14 is changed without the macroscopic movement of the lens system or time delay since each micromirror 18 of the variable focal length lenses 14 is actuated by electrostatic and/or electromagnetic force.

The all-in-focus image is sent to an object database system (not shown) for enrollment or a pattern recognition system 19. The pattern recognition system 19 includes an object database, an object detection algorithm, and a pattern recognition algorithm. Once the object of interest is detected, the imaging system can track the object in order to position the object in the center of the image by adjusting the optical axis of a variable focal length lens 13, as will be explained in FIG. 3.

Also, the focal length of the first variable focal length lens 13 can be controlled to change the field of view. For a high-resolution image, a camera system has a narrow angle of field of view (FOV). As FOV is decreased, the capturing area of the camera becomes narrow, and the object being tracked may be lost more easily (increase in dropout rate). Therefore, to increase or broaden the capturing area, the FOV of the camera must be increased. As the FOV is increased, the dropout rate of the tracked target decreases. However, the dropout rate of the tracked target increases as the speed of the target increases. In a conventional camera system, rapid change of the FOV is difficult because the response time of the lens driving system is relatively slow.

However, a lens system using a micromirror array lens (MMAL), as described in the embodiments of the present invention, is capable of rapid change in focal length. By using a time-sharing technique, the imaging camera/tracking system with MMAL may obtain both a narrow angle image and a broad angle image in a short time period. Therefore, the dropout rate of the tracked target is reduced and a high-resolution image is maintained. Furthermore, by making rapid change of the focal length, the imaging camera/tracking system with a MMAL may maintain focus on a fast moving object. The principles of maintaining focus on a fast moving object are described in detail in U.S. Pat. No. 10/896,146.

The field of view and the optical axis are adjusted without the macroscopic movement of the lens system or time delay.

Figure 2:
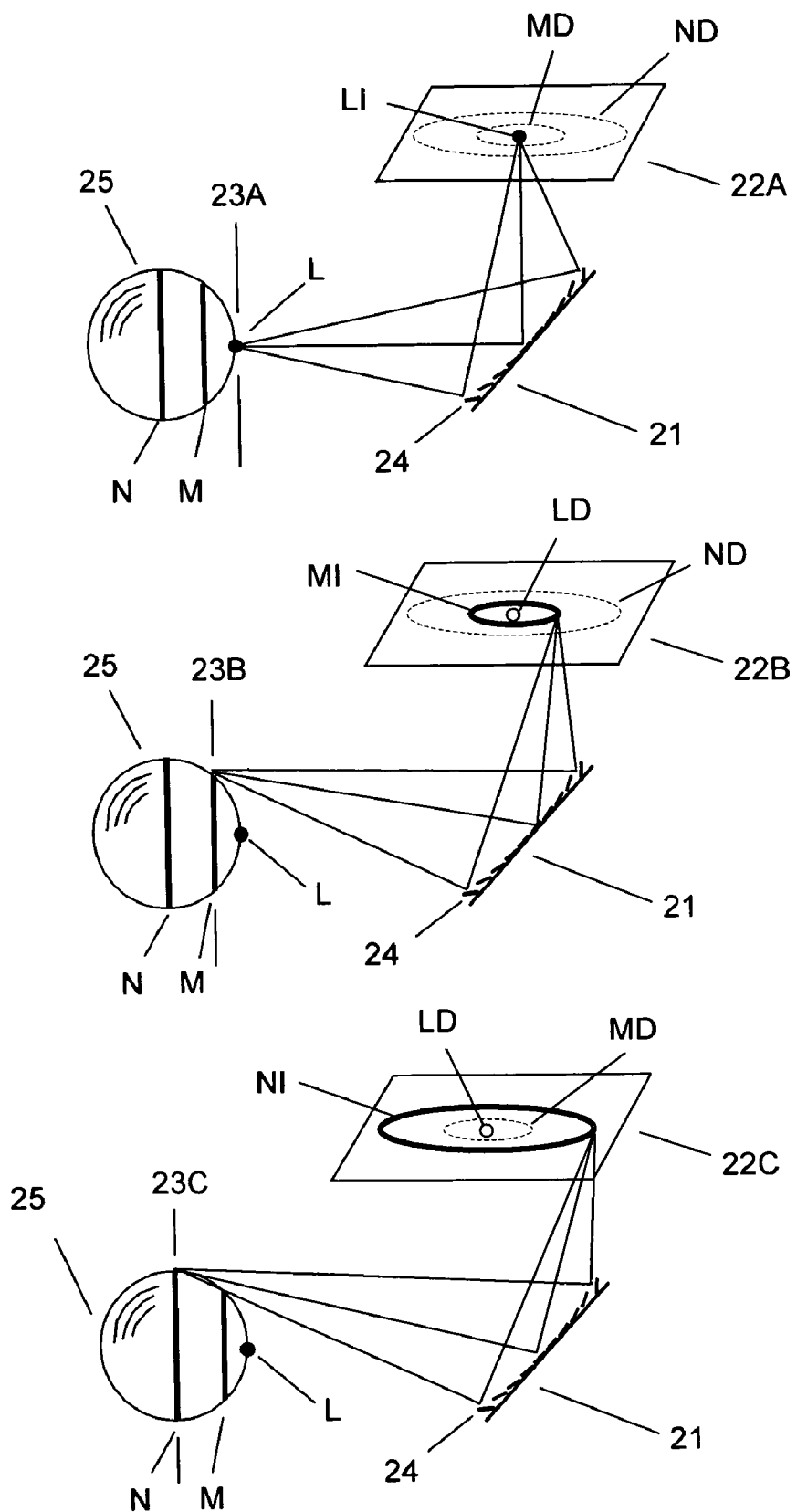
FIG. 2 is a schematic diagram showing how a three-dimensional image is obtained from two-dimensional images with different focal planes changing the focal length of the MMAL.

FIG. 2 shows how a MMAL 21 takes two-dimensional images 22A, 22B, 22C with the focal planes 23A, 23B, 23C changing the focal length of the MMAL 21. The MMAL 21 includes many micromirrors 24. The focal length of the MMAL 21 is changed by rotation and translation of each micromirror 24 by electrostatic and/or electromagnetic force. Two-dimensional images 22A, 22B, 22C are taken with the depth information which corresponds to the position of the focal plane. The two-dimensional image 22A has in-focus image LI at the focal plane 23A, which is the image of the portion L of an object 25. Images MD, ND of portion M, N of an object 25 are defocused. The image processing unit determines the in-focus pixels LI from the two-dimensional images 22A. The first two-dimensional image 22A gives in-focus pixels LI with the depth information of the focal plane 23A. The two-dimensional images 22B, 22C with the second and third focal plane 23B, 23C are processed in the same manner as the first focal plane to get in-focus images with depth information.

Figure 3A:
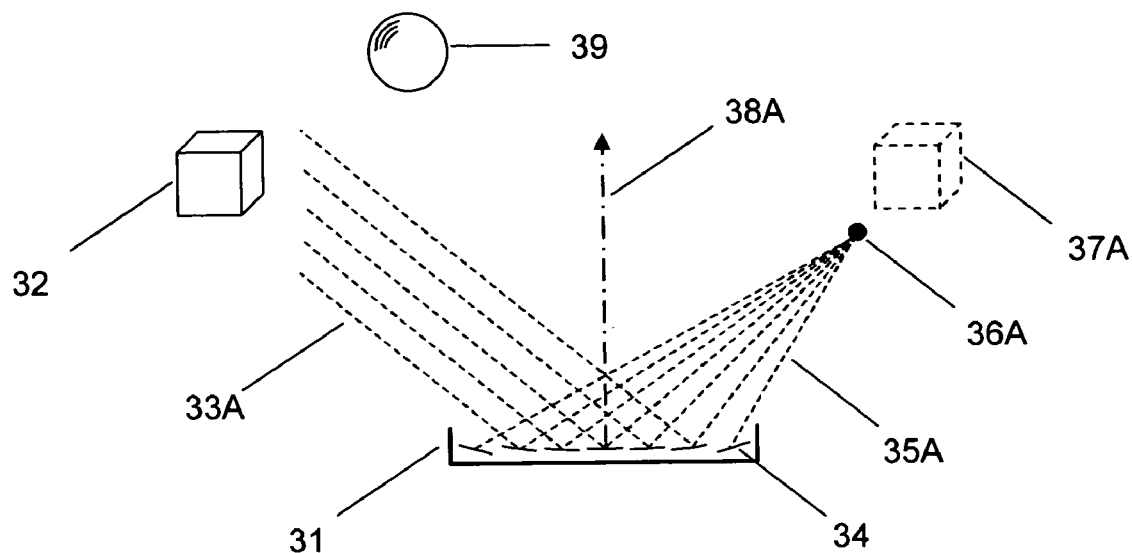
FIG. 3 is a schematic representation for optical axis changes of the MMAL.

FIG. 3 shows how the optical axis of the MMAL changes. A bunch of light is focused by the MMAL 31. In FIG. 3A, a cube object 32 is imaged onto the image plane. The light 33A from the object 32 is reflected by each of the micromirror 34. The reflected light 35A is focused onto the focal point 36A of the image and finally makes an image 37A of a cube in the image sensor. During the focusing process the optical axis is defined as a surface normal direction 38A of a micromirror 34.

Figure 3B:
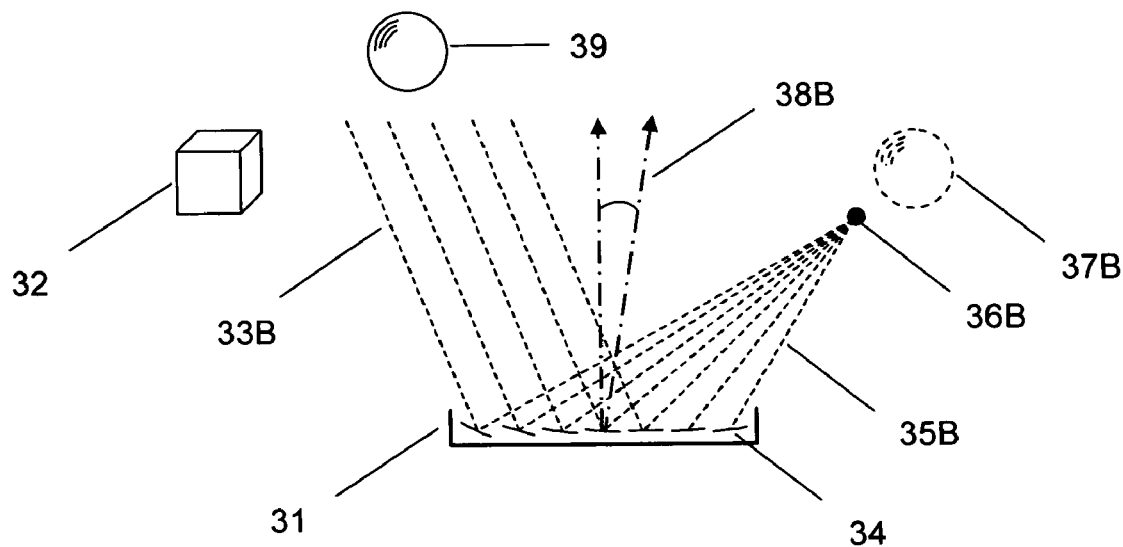

As shown in FIG. 3B, the MMAL can make a different image 37B from a target 39 without macroscopic movements. By changing the respective angles of the micromirrors 34, this time the MMAL accepts the light 33B from the target 39. The reflected light 35B is focused onto a focal point 36B and makes an image 37B of the target. This time the optical axis is changed by an angle and becomes the surface normal direction 38B of a micromirror.

Figure 4:
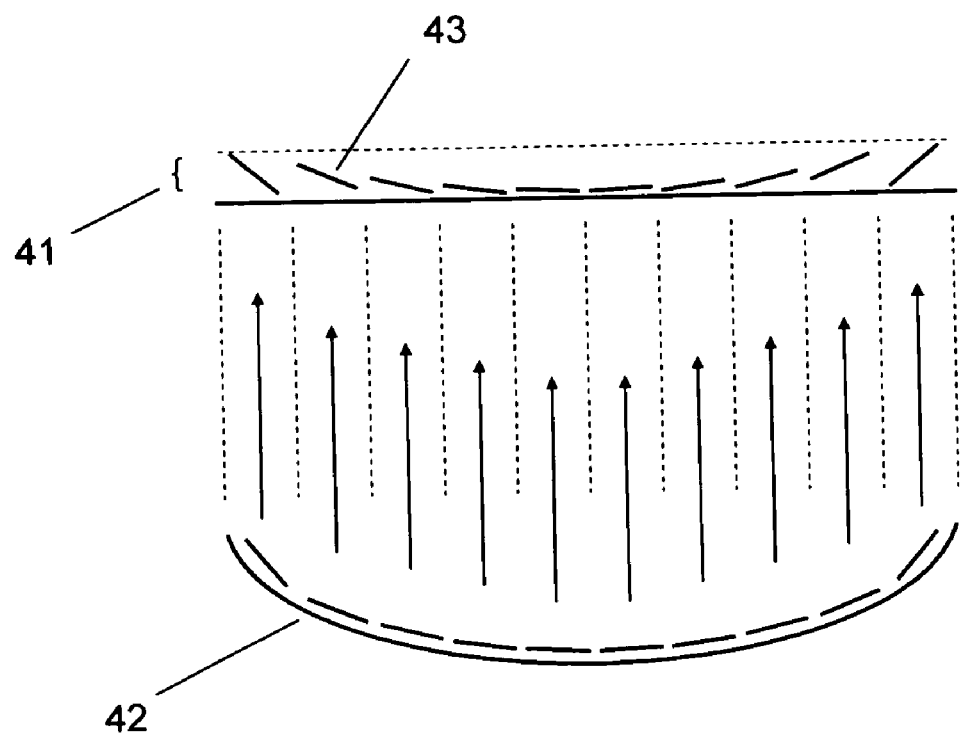
FIG. 4 shows the principle of the MMAL.

FIG. 4 shows the principle of a MMAL 41. Two conditions should be satisfied to build a perfect lens. One is a converging condition that all light scattered by one point of an object should converge into one point of the image plane. The other is the same phase condition that all the converging light at the image plane should have the same phase. To satisfy the perfect lens conditions, the surface shape of conventional reflective lens 42 reflects all the incident light scattered from one point of an object to one point on the image plane with the same optical path length traveled. Thanks to the periodicity of the light phase, the same phase condition can be satisfied even though the optical path length of the converging light is different. When the difference of the optical path length is exactly the same with the multiples of wavelength, the reflected beam at the focus meets the phase condition. Therefore, the surface shape of the conventional reflective lens 42 satisfying perfect lens conditions can be replaced by rotation and translation of micromirrors. Each micromirror 43 rotates to converge into focal point and translates to adjust the phase between the reflected lights from different micromirrors 43.

Figure 5:
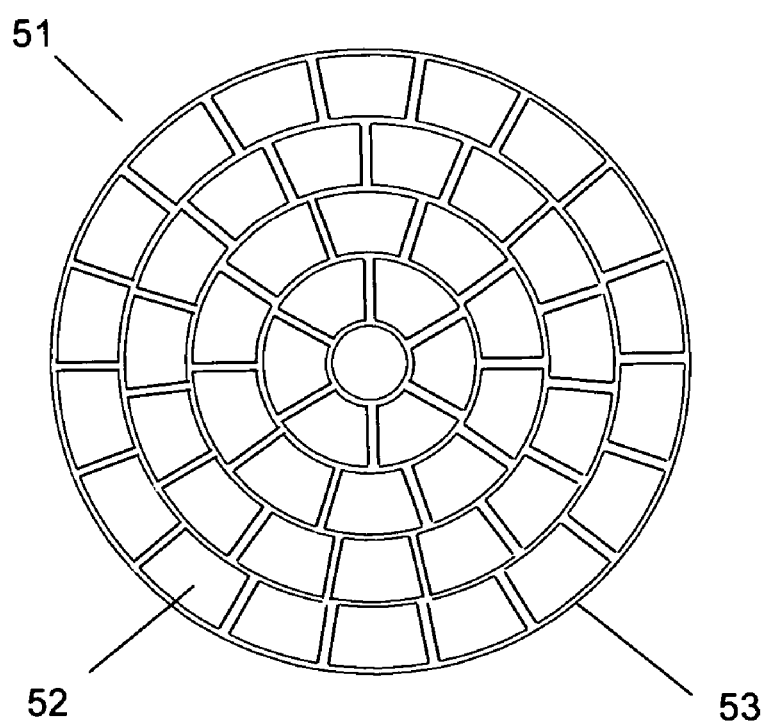
FIG. 5 is a schematic plane view displaying the structure of the lens that is made of many micromirrors and actuating components.

FIG. 5 illustrates the two-dimensional view of a MMAL 51. Each micromirror 52 of the MMAL 51 is controlled by electrostatic and/or electromagnetic force made by actuating components 53. Because a lens is axis-symmetric, the MMAL 51 can have a polar array of the micromirrors 52. Each of the micromirrors 52 can have a fan shape to maximize the effective reflecting area and increase the optical efficiency.

The mechanical structures upholding each micromirror and the actuating components to rotate and translate the micromirrors 52 are located under the micromirrors 52 so that the micromirrors 52 have larger active area.

Figure 6:
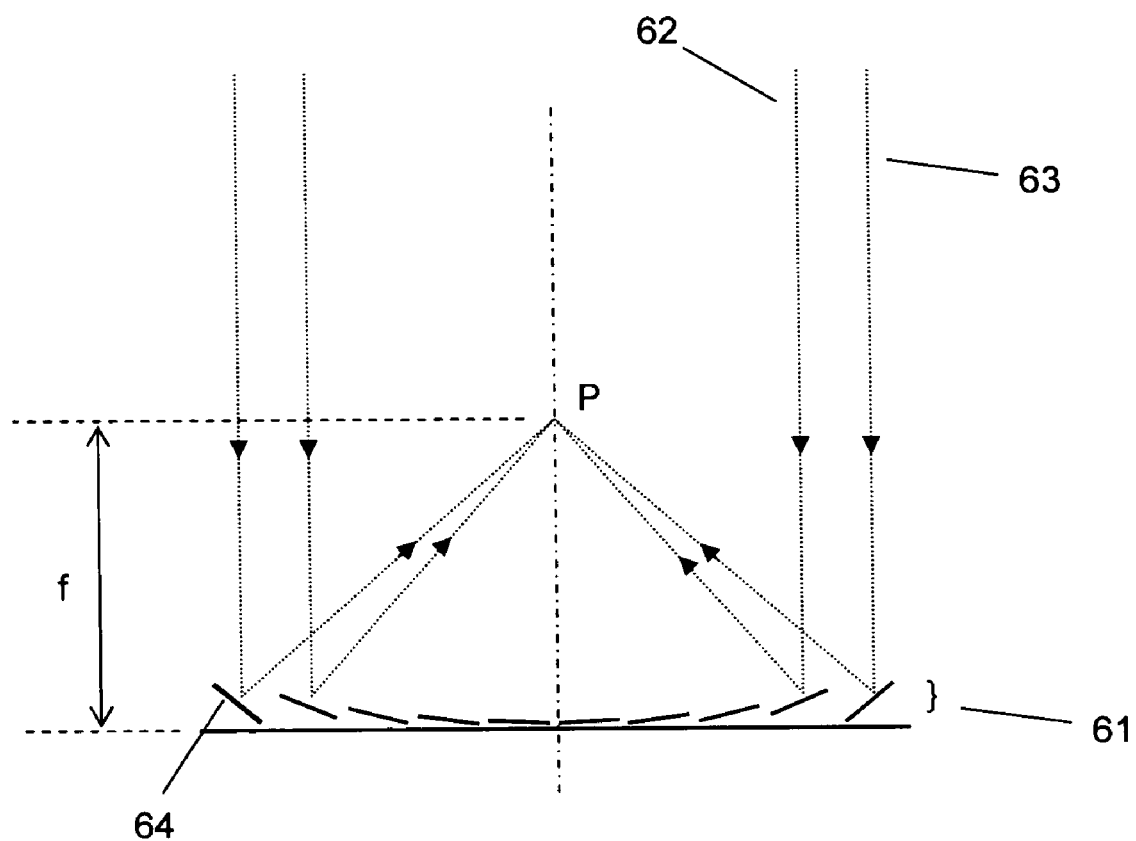
FIG. 6 is a schematic diagram displaying how the MMAL works as a single lens.

FIG. 6 illustrates how the MMAL 61 makes an image. Arbitrary scattered lights 62, 63 from the object are converged into one point P on the image plane by controlling the position of each of the micromirrors 64. Phases of individual lights 62, 63 can be adjusted to have the same value by translating each of the micromirrors 64. The required translational displacement is at least half of the wavelength of light.

The focal length f of the MMAL 61 is adjustable by controlling the rotation and/or translation of the micromirror 64. The operation of the MMAL 61 is possible by controlling only rotation regardless of the phase condition. In this case, the quality of the image generated by the MMAL is degraded by the aberration. Also translation only without rotation can form a Fresnel diffraction lens with the aberration. The smaller the sizes of the micromirrors 64 can reduce the aberration. Even though the focusing ability of the one motion by either rotation or translation is not powerful, the lens with one motion has the advantage of simple control and fabrication.

Since the ideal shape of the conventional lens 42 in FIG. 4 has a curvature even in the small size of the micromirror, it is strongly desired that each of the micromirrors 64 has a curvature itself. However, since the aberration of the lens with flat micromirrors 64 is not much different from the lens with curvature if the size of each micromirror is small enough, there is not much need to control the curvature.

What is claimed is:

1. An three-dimensional imaging system for pattern recognition comprising at least one camera system, the camera system including:

a) A lens system comprising at least one variable focal MMAL;

b) An imaging unit, optically coupled to a lens system, configured to receive the focused object image from the lens system and to sense the focused object image; and c) An image processing unit., communicatively coupled to the imaging unit, configured to process the object image sensed by the imaging unit and to generate all-in-focus image and position information of the object;

d) A pattern recognition unit comprising pattern recognition algorithm.

2. The three-dimensional imaging system of claim 1, wherein the pattern recognition unit comprises an object detection algorithm.

3. The three-dimensional imaging system of claim 1, wherein the pattern recognition unit comprises an object database.

4. The three-dimensional imaging system for pattern recognition of claim 1, wherein the focal plane of the imaging system is changed by change of focal length of the variable focal length lens.

5. The three-dimensional imaging system for pattern recognition of claim 1, wherein the imaging unit comprises one or more two-dimensional image sensor taking the two-dimensional image.

6. The three-dimensional imaging system for pattern recognition of claim 1, wherein the MMAL compensates for aberration.

7. The three-dimensional imaging system for pattern recognition of claim 6, wherein the aberration is caused by the imaging system.

8. The three-dimensional imaging system for pattern recognition of claim 1, wherein the MMAL is an adaptive optical component, wherein an object which does not lie on the optical axis can be imaged by the MMAL without macroscopic mechanical movement.

9. The three-dimensional imaging system for pattern recognition of claim 1, wherein the MMAL is an adaptive optical component, wherein the MMAL changes the field of view without macroscopic mechanical movement.

10. The three-dimensional imaging system for pattern recognition of claim 1, wherein the MMAL is an adaptive optical component, wherein the MMAL compensates for phase errors of light introduced by the medium between an object and its image.

11. The three-dimensional imaging system for pattern recognition of claim 1, further comprising adjusting the field of view of the camera system by adjusting the MMAL.

12. The three-dimensional imaging system for pattern recognition of claim 1, further comprising using a time-sharing technique to obtain a wide field of view image and a narrow field of view image within a short time period.

13. The three-dimensional imaging system for pattern recognition of claim 1, further comprising adjusting the optical axis of the camera system by adjusting the MMAL.

14. The three-dimensional imaging system for pattern recognition of claim 13, wherein the adjusting of the optical axis of the camera system by adjusting the MMAL is performed quickly to provide a large searching area.

15. The three-dimensional imaging system for pattern recognition of claim 1, further comprising an object tracking algorithm.

16. The three-dimensional imaging system for pattern recognition of claim 1, further comprising measuring three-dimensional information of an object by adjusting the MMAL.

17. The three-dimensional imaging system for pattern recognition of claim 1, further comprising correcting defects of the imaging system by adjusting the MMAL.

* * * * *